United States Patent
Yagasaki et al.

(10) Patent No.: US 8,926,404 B2
(45) Date of Patent: Jan. 6, 2015

(54) METHOD FOR MANUFACTURING METAL RING OF CONTINUOUSLY VARIABLE TRANSMISSION METAL BELT

(75) Inventors: Toru Yagasaki, Wako (JP); Hideaki Aoyama, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 903 days.

(21) Appl. No.: 13/105,901

(22) Filed: May 12, 2011

(65) Prior Publication Data
US 2011/0319210 A1    Dec. 29, 2011

(30) Foreign Application Priority Data

Jun. 25, 2010 (JP) ................................. 2010-145129

(51) Int. Cl.
*B24B 1/00* (2006.01)
*G01B 21/10* (2006.01)
*B24B 29/00* (2006.01)
*B24D 13/14* (2006.01)
*F16G 13/06* (2006.01)

(52) U.S. Cl.
CPC .............. *G01B 21/10* (2013.01); *B24B 29/005* (2013.01); *B24D 13/145* (2013.01); *F16G 13/06* (2013.01)
USPC ................................. 451/56; 451/49; 451/59

(58) Field of Classification Search
CPC .......... B24B 29/005; B24B 1/00; B24B 9/00; B24B 5/04; B24B 29/04; B24D 13/145; G01B 21/10; F16G 13/06
USPC ................................. 451/49, 56, 59; 474/240
See application file for complete search history.

(56) References Cited

U.S. PATENT DOCUMENTS

| | | | | |
|---|---|---|---|---|
| 6,581,269 B2 * | 6/2003 | Someno et al. | ................. | 29/558 |
| 7,413,496 B2 * | 8/2008 | Yoshimura et al. | ............... | 451/5 |
| 8,460,063 B2 * | 6/2013 | Suzuki | ........................... | 451/51 |
| 2008/0064304 A1 * | 3/2008 | Iga | ................................... | 451/57 |

FOREIGN PATENT DOCUMENTS

| | | |
|---|---|---|
| JP | 2002-098516 | 4/2002 |
| JP | 2002-248522 | 9/2002 |
| JP | 2004-162134 | 6/2004 |
| JP | 2005-021994 | 1/2005 |
| JP | 4440621 B2 | 6/2005 |
| JP | 3981069 B2 | 7/2005 |

OTHER PUBLICATIONS

Japanese Office Action for corresponding JP Application No. 2010-145129, Jan. 6, 2012.

* cited by examiner

*Primary Examiner* — Timothy V Eley
(74) *Attorney, Agent, or Firm* — Mori & Ward, LLP (57) ABSTRACT

A continuously variable transmission metal belt includes a metal ring assembly and metal elements. The metal ring assembly includes stacked endless metal rings. Each of the stacked endless metal rings includes a flat peripheral surface and a substantially semicircular end face. The substantially semicircular end face is connected to an end of the peripheral surface in a width direction of each of the stacked endless metal rings. The metal elements are supported on the metal ring assembly. A displacement Z of the end face is smaller than or equal to 0.1R. The displacement Z is defined as Z=R−H. R is a radius of an imaginary circle that passes through a contact point between the peripheral surface and the end face and that is tangent to the end face. H is a distance from a center of the imaginary circle to the peripheral surface.

8 Claims, 10 Drawing Sheets

METHOD FOR MANUFACTURING METAL RING OF CONTINUOUSLY VARIABLE TRANSMISSION METAL BELT

CROSS-REFERENCE TO RELATED APPLICATIONS

The present application claims priority under 35 U.S.C. §119 to Japanese Patent Application No. 2010-145129 filed in the Japan Patent Office on Jun. 25, 2010, entitled "Continuously Variable Transmission Metal Belt, Method for Manufacturing Metal Ring of Continuously Variable Transmission Metal Belt, and Method for Measuring Shape of Metal Ring of Continuously Variable Transmission Metal Belt." The contents of this application are incorporated herein by reference in their entirety.

BACKGROUND OF THE INVENTION

1. Field of the Invention

The present invention relates to a continuously variable transmission metal belt, a method for manufacturing a metal ring for the continuously variable transmission metal belt, and a method for measuring a shape of a metal ring for the continuously variable transmission metal belt.

2. Description of the Related Art

Japanese Patent No. 3981069 discloses a belt-type continuously variable transmission including a metal belt including metal rings, wherein the most projecting portion of an end face of each metal ring in a width direction is located between a radially central plane and a radially inner peripheral surface of the metal ring. With this structure, the position at which the projecting portion abuts against a V-face of a pulley is closer to the radially central plane than to the radially inner peripheral surface of the metal ring. Accordingly, the sum of a compression stress caused by the bending force applied to the metal ring wound around the pulley and a Hertz stress generated when the projecting portion comes into contact with the V-face of the pulley decreases. As a result, the fatigue life of the metal ring is increased.

In addition, Japanese Patent No. 4440621 discloses a process of slicing a metal drum to form an intermediate product of a metal ring having a predetermined width and polishing an angular end face of the intermediate product into a semicircular shape with a polishing brush.

SUMMARY OF THE INVENTION

According to one aspect of the present invention, a continuously variable transmission metal belt includes a metal ring assembly and a plurality of metal elements. The metal ring assembly includes a plurality of stacked endless metal rings. Each of the plurality of stacked endless metal rings includes a flat peripheral surface and a substantially semicircular end face. The substantially semicircular end face is connected to an end of the peripheral surface in a width direction of each of the plurality of stacked endless metal rings. The plurality of metal elements are supported on the metal ring assembly. A displacement Z of the end face is smaller than or equal to 0.1R. The displacement Z is defined as Z=R−H. R is a radius of an imaginary circle that passes through a contact point between the peripheral surface and the end face and that is tangent to the end face. H is a distance from a center of the imaginary circle to the peripheral surface.

According to another aspect of the present invention, a method for manufacturing a metal ring for a continuously variable transmission metal belt includes polishing an end face of the metal ring with a polishing brush to form the end face into a substantially semicircular shape. The end face is connected to an end of a flat peripheral surface of the metal ring in a width direction of the metal ring. A displacement Z of the end face is set smaller than or equal to 0.1R. The displacement Z is defined as Z=R−H. R is a radius of an imaginary circle that passes through a contact point between the peripheral surface and the end face and that is tangent to the end face. H is a distance from a center of the imaginary circle to the peripheral surface.

According to further aspect of the present invention, a method for measuring a shape of a metal ring for a continuously variable transmission metal belt includes measuring coordinates of a plurality of measurement points on a flat peripheral surface and an substantially semicircular end face of the metal ring. The end face is connected to an end of the peripheral surface in a width direction of the metal ring. Coordinates of a contact point between the peripheral surface and the end face are determined based on a series of the coordinates of the plurality of measurement points. Coordinates of a center of an imaginary circle are determined with a least squares method using the coordinates of the contact point and the coordinates of the plurality of measurement points on the end face arranged continuously from the contact point. The imaginary circle passes through the contact point and is tangent to the end face. A displacement Z of the end face is calculated. The displacement Z is defined as Z=R−H. R is a radius of the imaginary circle. H is a distance from the center of the imaginary circle to the peripheral surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Embodiments of the present invention will be described with reference to FIGS. 1 to 10, wherein like reference numerals designate corresponding or identical elements throughout the various drawings.

Figure 2:
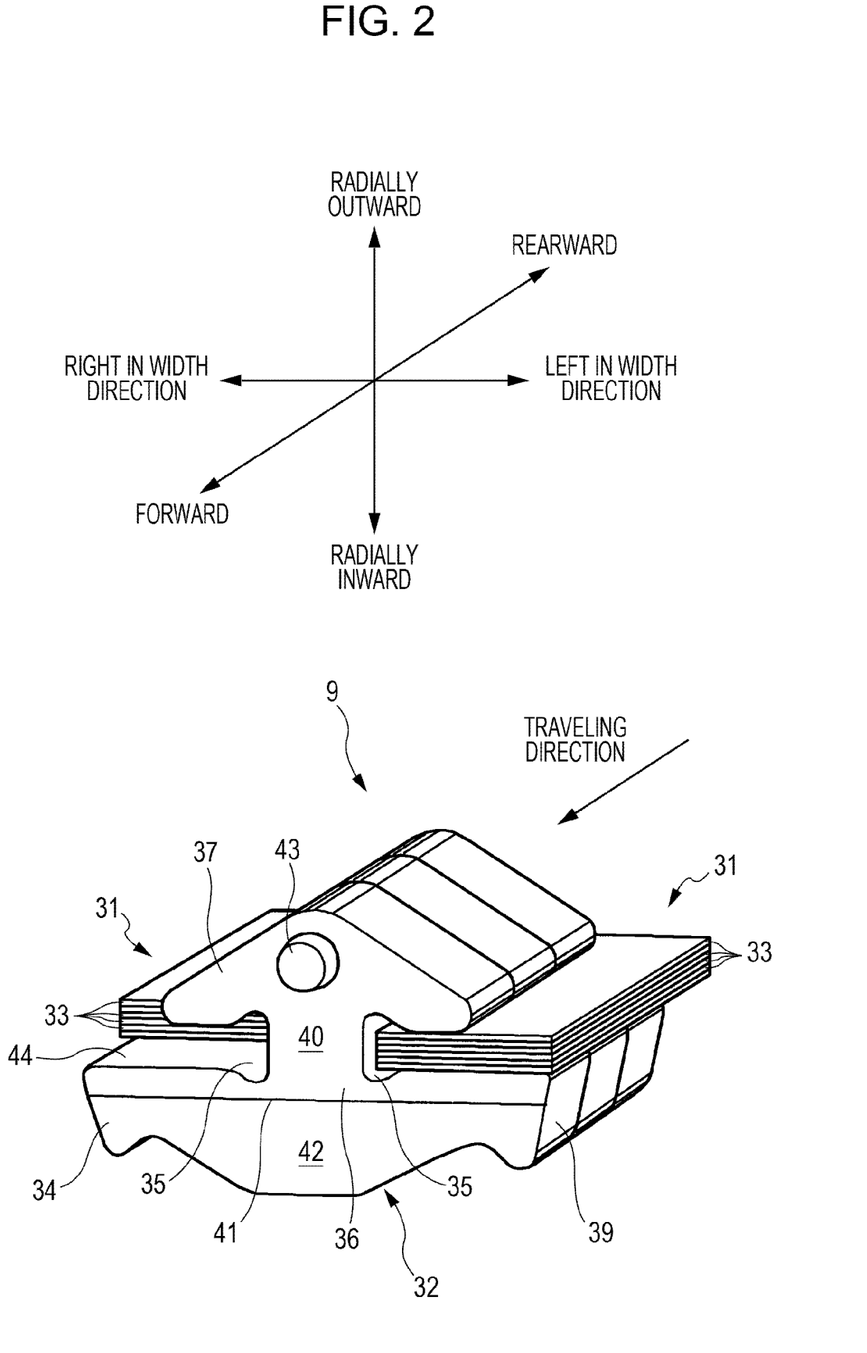
FIG. 2 is a partial perspective view of a metal belt.

The forward and rearward directions, the width directions, and the radial directions of metal elements and metal rings according to the present embodiment are defined as shown in FIG. 2. The radial directions are defined as the radial directions of a pulley with which the metal elements are in contact. The direction toward a shaft of the pulley is defined as the radially inward direction and the direction away from the shaft of the pulley is defined as the radially outward direction. The width directions are defined as the directions along the shaft of the pulley with which the metal elements are in contact, and the forward and rearward directions are defined as the directions of the metal elements along a traveling direction of the vehicle when the vehicle moves forward.

Figure 1:
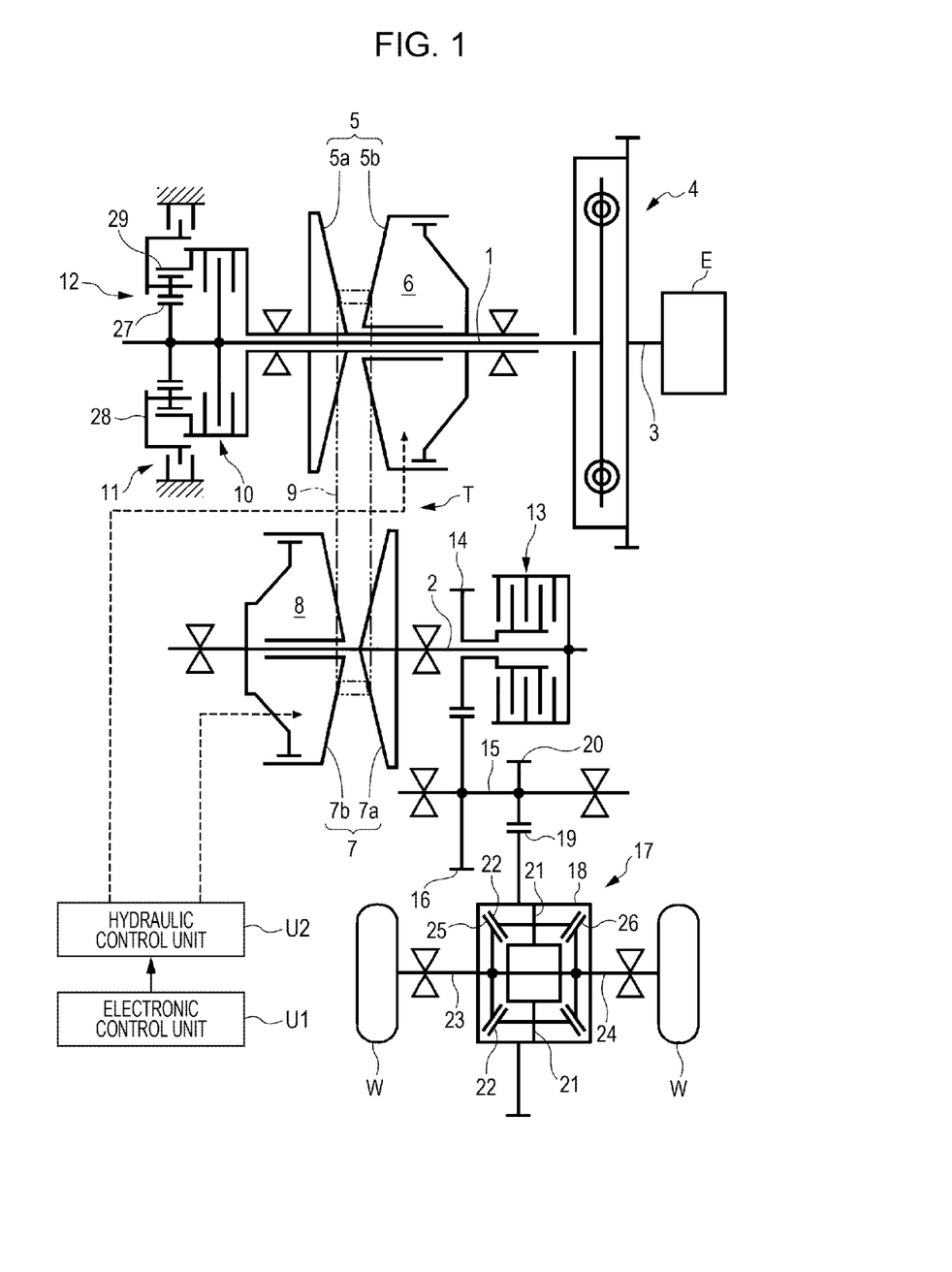
FIG. 1 is a skeletal diagram of a power transmission system of a vehicle having a metal-belt-type continuously variable transmission.

As shown in FIG. 1, a metal-belt-type continuously variable transmission T for a vehicle includes a driving shaft 1 and a driven shaft 2, which are disposed parallel to each other. The left end of a crankshaft 3 of an engine E is connected to the right end of the driving shaft 1 with a damper 4 provided therebetween.

A driving pulley 5, which is supported on the driving shaft 1, includes a fixed pulley half 5a that is rotatable relative to the driving shaft 1 and a movable pulley half 5b that is axially slidable relative to the fixed pulley half 5a. The movable pulley half 5b is capable of varying a groove width between the fixed pulley half 5a and the movable pulley half 5b in response to a hydraulic pressure applied to a working oil chamber 6. A driven pulley 7, which is supported on the driven shaft 2, includes a fixed pulley half 7a that is formed integrally with the driven shaft 2 and a movable pulley half 7b that is axially slidable relative to the fixed pulley half 7a. The movable pulley half 7b is capable of varying a groove width between the fixed pulley half 7a and the movable pulley half 7b in response to a hydraulic pressure applied to a working oil chamber 8. A metal belt 9 including two metal ring assemblies and a plurality of metal elements attached to the metal ring assemblies is wound around the driving pulley 5 and the driven pulley 7.

A forward/rearward switching mechanism 12 composed of a single pinion planetary gear mechanism is provided at the left end of the driving shaft 1. The forward/rearward switching mechanism 12 includes a forward clutch 10 and a reverse brake 11. The forward clutch 10 engages with the driving shaft 1 when establishing a forward gear stage and transmits the rotation of the driving shaft 1 to the driving pulley 5 in the same direction. The reverse brake 11 engages with the driving shaft 1 when establishing a rearward gear stage and transmits the rotation of the driving shaft 1 to the driving pulley 5 in the opposite direction. The forward/rearward switching mechanism 12 is provided with a sun gear 27 that is fixed to the driving shaft 1, a planetary carrier 28 that can be restrained to a casing by the reverse brake 11, and a ring gear 29 that can be coupled to the driving pulley 5 by the forward clutch 10.

A starting clutch 13, which is provided at the right end of the driven shaft 2, couples a first intermediate gear 14, which is supported on the driven shaft 2 in a relatively rotatable manner, to the driven shaft 2. A second intermediate gear 16 that meshes with the first intermediate gear 14 is provided on an intermediate shaft 15, which is disposed parallel to the driven shaft 2. A third intermediate gear 20 provided on the intermediate shaft 15 meshes with an input gear 19 provided on a gear box 18 of a differential gear 17. A pair of pinions 22 and 22, which are supported by pinion shafts 21 and 21 in the gear box 18, mesh with side gears 25 and 26. The side gears 25 and 26 are provided at ends of a left axle 23 and a right axle 24 that are supported in the gear box 18 in a relatively rotatable manner. Driven wheels W and W are connected to the other ends of the left axle 23 and the right axle 24.

When a forward range is selected by a selecting lever, first, the forward clutch 10 is brought into an engaged state in response to a command from a hydraulic control unit U2 operated by an electronic control unit U1. Thus, the driving shaft 1 is integrally coupled to the driving pulley 5. Then, the starting clutch 13 is brought into an engaged state. Accordingly, a torque of the engine E is transmitted to the driven wheels W and W through the driving shaft 1, the driving pulley 5, the metal belt 9, the driven pulley 7, the driven shaft 2 and the differential gear 17, so that the vehicle starts moving forward. When a reverse range is selected by the selecting lever, the reverse brake 11 is brought into an engaged state in response to a command from the hydraulic control unit U2. Accordingly, the driving pulley 5 is driven in a direction opposite from the direction of rotation of the driving shaft 1. Therefore, the vehicle starts moving rearward when the starting clutch 13 is brought into an engaged state.

When the vehicle is started in the above-described manner, the hydraulic pressure supplied to the working oil chamber 6 in the driving pulley 5 is increased by the command from the hydraulic control unit U2, so that the movable pulley half 5b of the driving pulley 5 moves toward the fixed pulley half 5a and the effective radius is increased. In addition, the hydraulic pressure supplied to the working oil chamber 8 in the driven pulley 7 is reduced by the command from the hydraulic control unit U2, so that the movable pulley half 7b of the driven pulley 7 moves away from the fixed pulley half 7a and the effective radius is reduced. Thus, the ratio of the metal-belt-type continuously variable transmission T is continuously varied from a LOW side toward an OD side.

As shown in FIG. 2, the metal belt 9 includes a pair of left and right metal ring assemblies 31 and 31 and a plurality of metal elements 32 supported on the metal ring assemblies 31 and 31. Each metal ring assembly 31 includes a plurality of metal rings 33 stacked on top of each other. Each metal element 32 is punched out from a metal sheet and includes an element main body 34, a neck portion 36 positioned between left and right ring slots 35 and 35 into which the metal ring assemblies 31 and 31 are fitted, and a substantially triangular ear portion 37 that is connected to the radially outer periphery of the element main body 34 by the neck portion 36. A pair of pulley contact surfaces 39 and 39 that come into contact with the driving pulley 5 and the driven pulley 7 are formed at the left and right ends of the element main body 34. Main surfaces 40 are formed on the front and rear sides of each metal element 32 in the traveling direction, the main surfaces 40 of the adjacent metal elements 32 abutting each other. An inclined surface 42 is formed below the main surface 40 on the front side in the traveling direction, and a rocking edge 41 that extends in the left and right direction is provided between the main surface 40 and the inclined surface 42. Each metal element 32 is provided with projecting and recessed portions 43 formed at the front and rear surfaces of the ear portion 37, the projecting and recessed portions 43 being engageable with each other such that the adjacent metal elements 32 may be coupled to each other. Saddle faces 44 and 44 that support the inner peripheral surfaces of the metal ring assemblies 31 and 31 are formed at the bottom of the left and right ring slots 35 and 35.

Figure 3A:
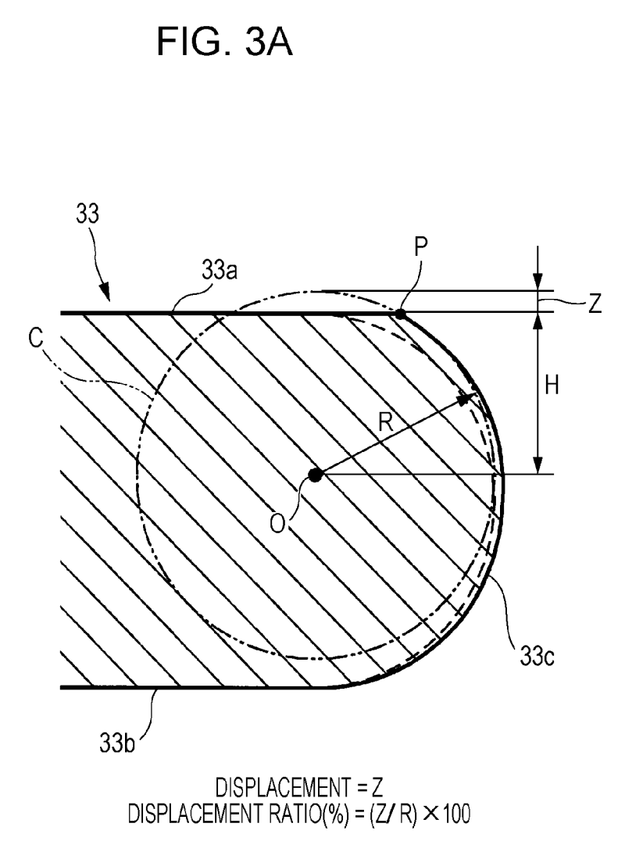
FIGS. 3A and 3B are diagrams illustrating a displacement of an end face of a metal ring, a method for calculating the displacement, and a displacement ratio.
Figure 3B:
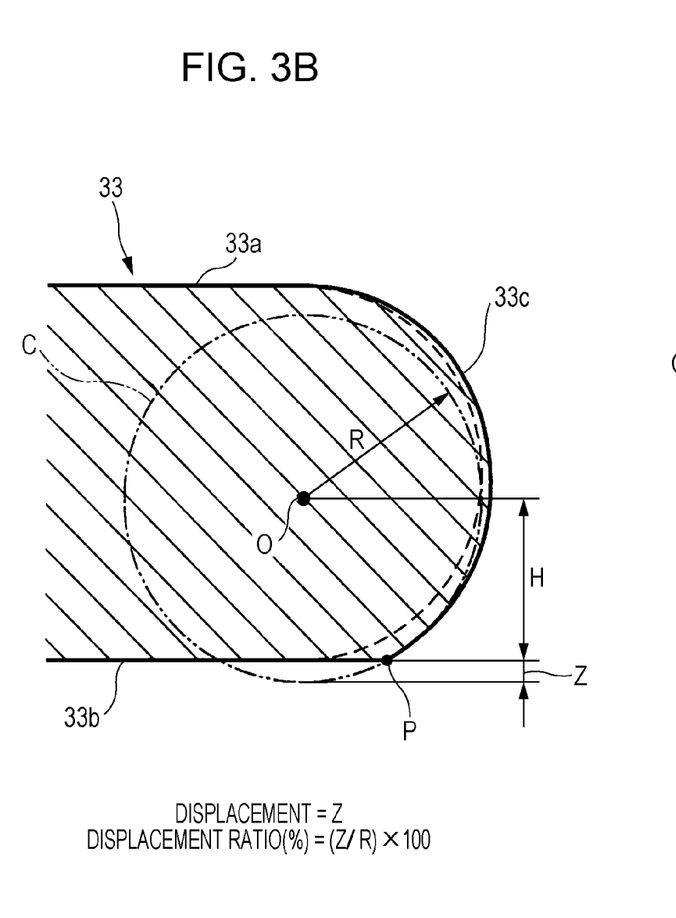

FIGS. 3A and 3B are cross sectional views of an end portion of each metal ring 33 in the width direction. The metal ring 33 includes an outer peripheral surface 33a and an inner peripheral surface 33b that are flat and parallel to each other and two end faces 33c and 33c that connect the peripheral surfaces 33a and 33b at the ends thereof in the width direction (only one end face 33c is illustrated in FIGS. 3A and 3B). Each end face 33c has a substantially semicircular shape and is connected to the peripheral surfaces 33a and 33b. The ideal shape of the end face 33c is a semicircle shown by the broken line that smoothly continues to the peripheral surfaces 33a and 33b. However, owing to the processing errors of the metal ring 33, the actual shape of the end face 33c shown by the solid line differs from the ideal shape thereof. In this specification, the difference between the ideal shape and the actual shape of the end face 33c is defined as "displacement".

First, the shape of a portion of the metal ring 33 around the end face 33c thereof is measured with a measurement device including, for example, a contact probe or a laser, and the displacement is calculated on the basis of the measurement result. FIG. 3A illustrates the displacement at the outer peripheral surface 33a of the metal ring 33 and a method for calculating the displacement. First, coordinates of a plurality of measurement points on the peripheral surfaces 33a and 33b and the end face 33c of the metal ring 33 are determined. Then, the coordinates of a contact point P between the outer peripheral surface 33a and the end face 33c are determined from the series of coordinates of the measurement points. Then, an imaginary circle C (shown by the chain line) that is tangent to the end face 33c at the contact point P is determined by the least squares method using the coordinates of the contact point P and the coordinates of the measurement points on the end face 33c that are arranged continuously from the contact point P. The coordinates of the center O and the radius of curvature R of the imaginary circle C are also determined.

The end face 33c and the imaginary circle C have the same tangential line and the radius of curvature R at the contact point P at which they are in contact with each other. When H is the distance between the center O of the imaginary circle C and the outer peripheral surface 33a, the displacement Z is defined as R−H. In addition, the displacement ratio (%) is defined as (Z/R)×100.

FIG. 3B illustrates the displacement at the inner peripheral surface 33b of the metal ring 33 and a method for calculating the displacement. The displacement and the calculating method thereof are basically the same as those for the outer peripheral surface 33a of the metal ring 33 described above. The displacement Z is defined as R−H, and the displacement ratio (%) is defined as (Z/R)×100.

A method for manufacturing the metal ring 33 includes a step of manufacturing a cylindrical metal drum, a step of slicing the metal drum to form an intermediate product of the metal ring 33 having a predetermined width, a step of polishing angular end faces 33c and 33c of the intermediate product of the metal ring 33 into a semicircular shape is cross section with a polishing brush, and a step of nitriding the surface of the intermediate product of the metal ring 33 having the polished end faces 33c and 33c to increase the hardness thereof.

Figure 4:
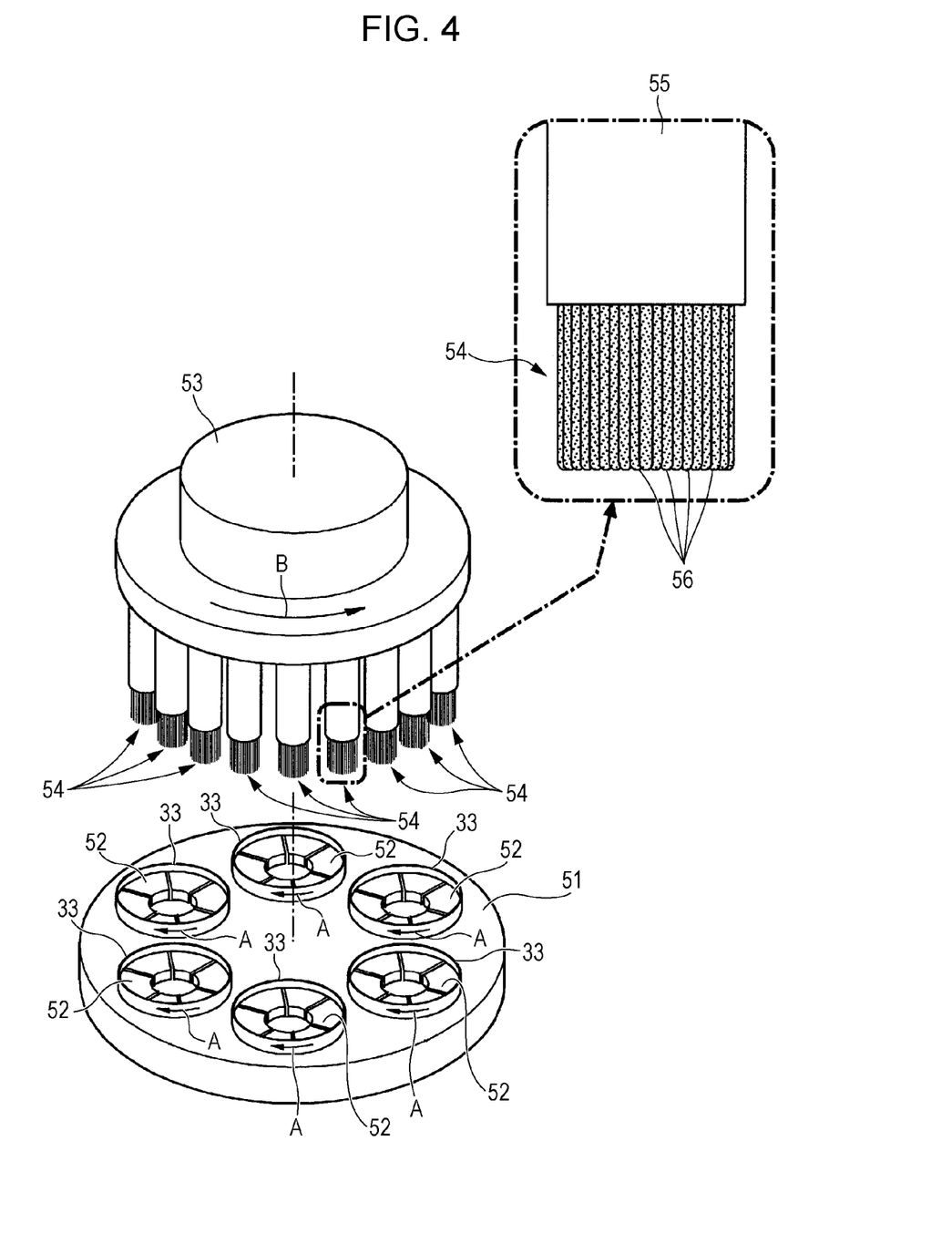
FIG. 4 is a diagram illustrating a polishing device for the metal ring.

FIG. 4 illustrates a polishing device for polishing the metal rings 33. Six metal ring holders 52 are arranged on a table 51 along a circumferential direction with spaces therebetween, and the metal rings 33 are held by the metal ring holders 52. A plurality of polishing brushes 54 are attached to a brush head 53 that coaxially faces the table 51 from above. The polishing brushes 54 are arranged along the circumferential direction with spaces therebetween. The six metal ring holders 52 are rotated in the direction shown by arrow A on the table 51, and the brush head 53 is rotated in the direction shown by arrow B. While the metal ring holders 52 and the brush head 53 are being rotated, the brush head 53 is moved downward so that the polishing brushes 54 come into contact with the end faces 33c at one end of the metal rings 33 and the end faces 33c are polished into a semicircular shape in cross section. After the end faces 33c at one end of the metal rings 33 are polished, the metal rings 33 are turned over and are held by the metal ring holders 52 again. Then, the end faces 33c at the other end are polished.

The part shown by the chain line in FIG. 4 shows the structure of each polishing brush 54. A bundle of wires 56 is implanted into a shaft portion 55, which is fixed to the brush head 53, at the bottom end thereof. The wires 56 of the polishing brush 54 are composed of, for example, wires made of synthetic resin containing grain of diamond or hard metal, or electrodeposited grain wires made of metal on the surfaces of which grain of diamond or hard metal is electrodeposited. The polishing brushes 54 composed of the electrodeposited grain wires have higher durability than the polishing brushes 54 composed of the wires made of synthetic resin containing grain. Therefore, the processing accuracy of the end faces 33c can be maintained at a high level even when the frequency of dressing is reduced.

Figure 5:
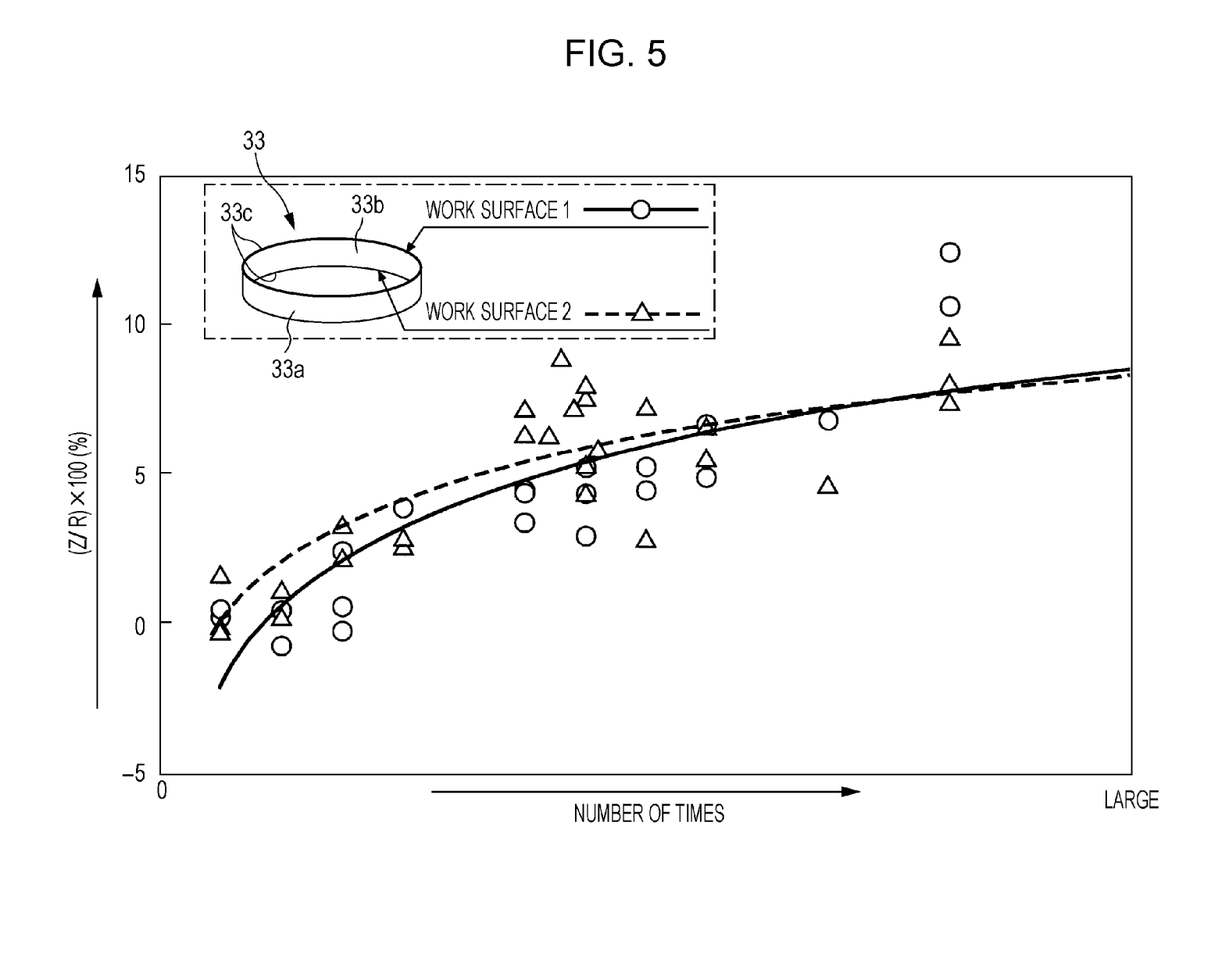
FIG. 5 is a graph illustrating the relationship between the number of times polishing brushes including resin wires containing grain were used and the displacement ratio (when dressing was not performed)

FIG. 5 is a graph illustrating the relationship between the number of times the polishing brushes 54 were used without dressing in the process of polishing the end faces 33c of the metal rings 33 and the displacement ratio (Z/R)×100 (%) of the end faces 33c of the metal rings 33. Here, the polishing brushes 54 having the wires 56 made of synthetic resin containing grain were used.

When the number of times is small and the polishing brushes 54 are still fresh, the displacement ratio of the end faces 33c of the metal rings 33 is substantially 0. As the number of times increases and the polishing brushes 54 become degraded, the displacement ratio of the end faces 33c of the metal rings 33 gradually increases. This is probably because a central part of the bundle of the wires 56 of each polishing brush 54 gradually becomes hollow.

Figure 6:
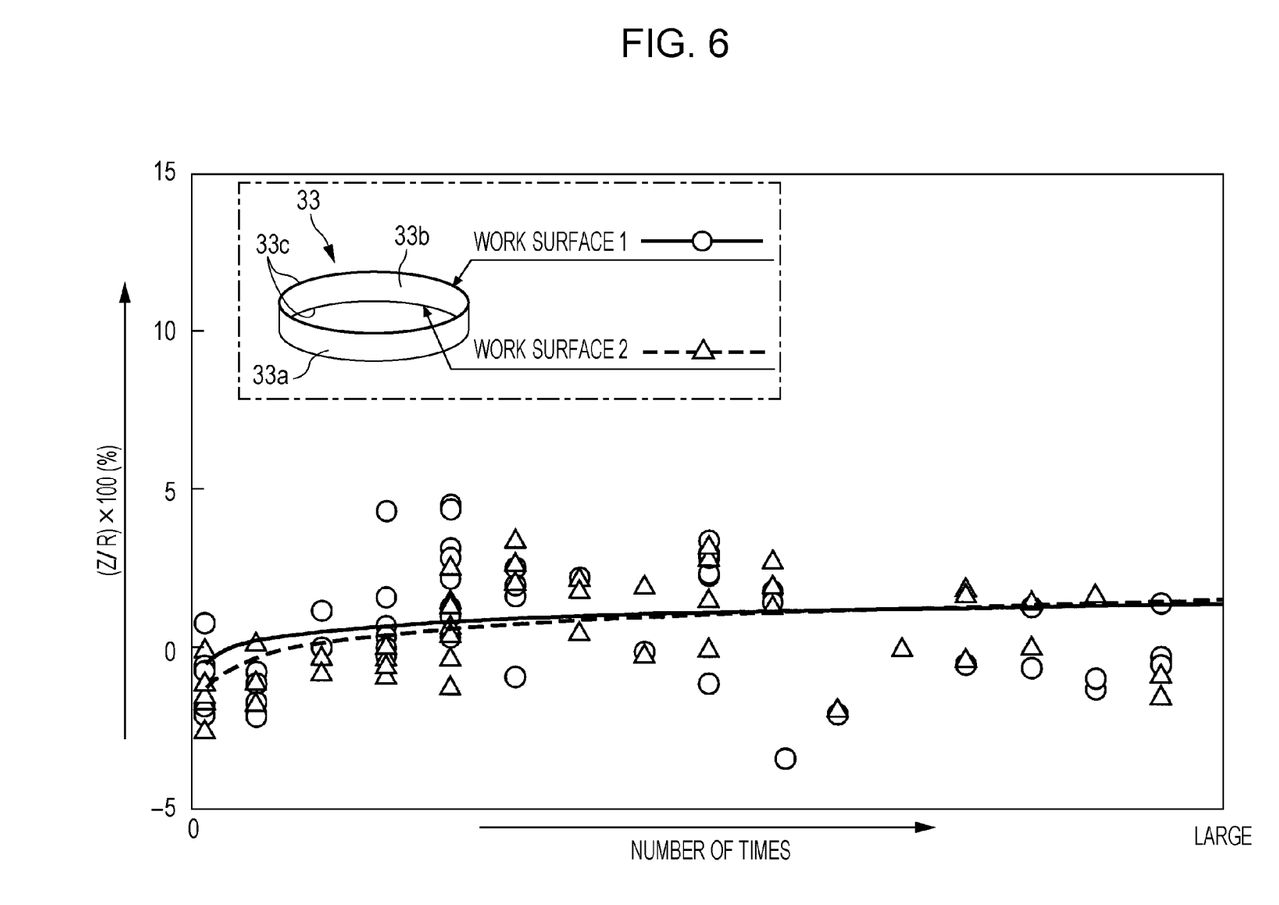
FIG. 6 is a graph illustrating the relationship between the number of times the polishing brushes including the resin wires containing grain were used and the displacement ratio (when dressing was performed)

FIG. 6 is a graph illustrating the relationship between the number of times the polishing process was performed and the displacement ratio (Z/R)×100 (%) in the case where dressing was performed each time the polishing process is finished. In the dressing process, the end portions of the wires 56 of the polishing brushes 54 were aligned along a flat plane. In this case, the displacement ratio of the end faces 33c of the metal rings 33 hardly increases even when the total number of times the polishing process is performed increases. Thus, the processing accuracy of the end faces 33c of the metal rings 33 can be increased by frequently subjecting the polishing brushes 54 to the dressing process.

Figure 7:
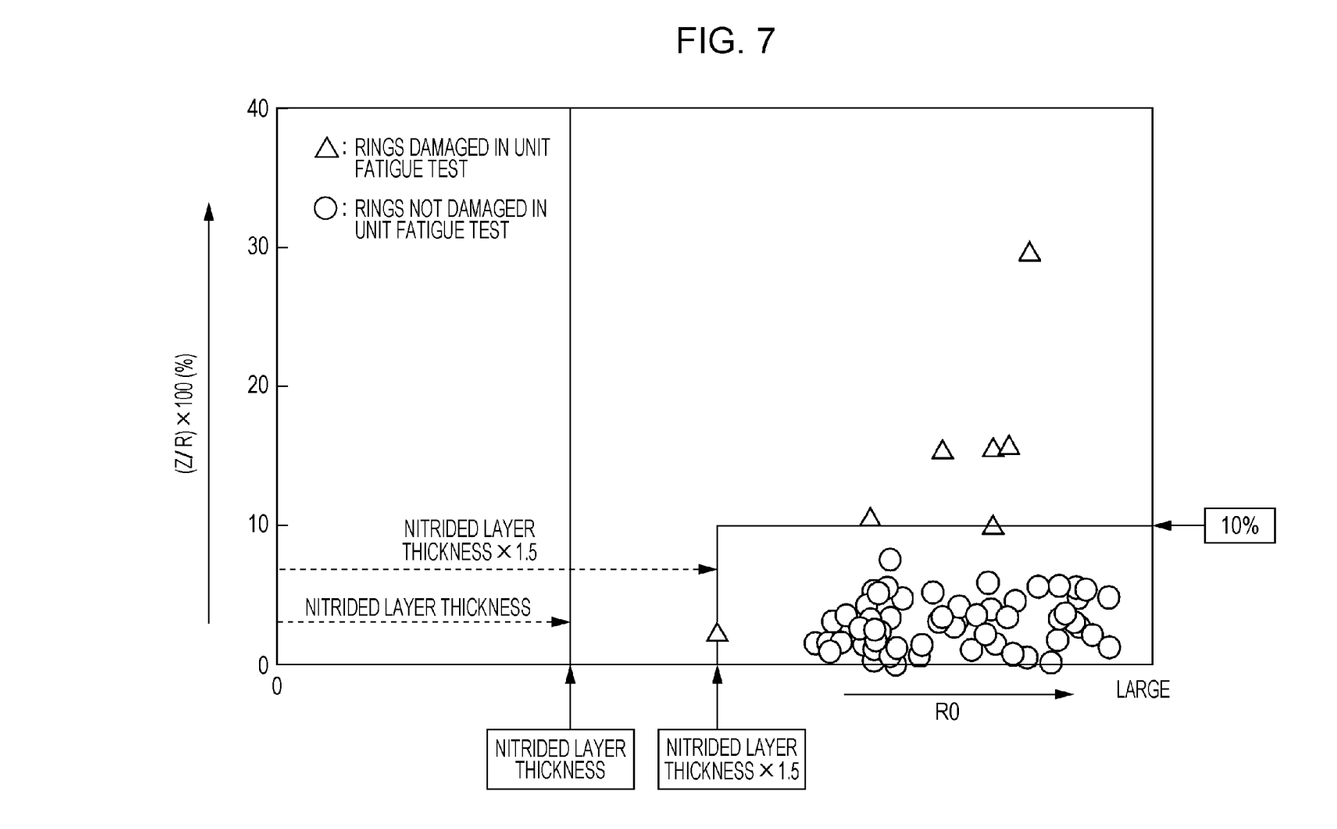
FIG. 7 is a graph illustrating the effect of the radius of curvature and the displacement ratio of the end face of the metal ring on the durability.

FIG. 7 is a graph in which the horizontal axis shows the radius of curvature of the end faces 33c of the metal rings 33 and the vertical axis shows the displacement ratio (Z/R)×100 (%) of the end faces 33c of the metal rings 33. In this graph, the triangles show the samples damaged in the unit fatigue test and the circles show the samples not damaged in the unit fatigue test.

As is clear from this graph, the metal rings 33 are not damaged if the displacement ratio (Z/R)×100 (%) of the end faces 33c of the metal rings 33 is less than or equal to 10% and the radius of curvature R0 of the end faces 33c of the metal rings 33 is greater than or equal to 1.5 times the thickness (for example, 30 μm) of the nitrided layer at the surface. When the displacement ratio (Z/R)×100 (%) of the end faces 33c of the metal rings 33 is less than or equal to 10%, the shape of the end faces 33c is close to the ideal shape shown by the broken line in FIG. 3. When the radius of curvature of the end faces 33c of the metal rings 33 is greater than or equal to 1.5 times the thickness of the nitrided layer, it means that the nitrided layer is not excessively thick.

Figure 8A:
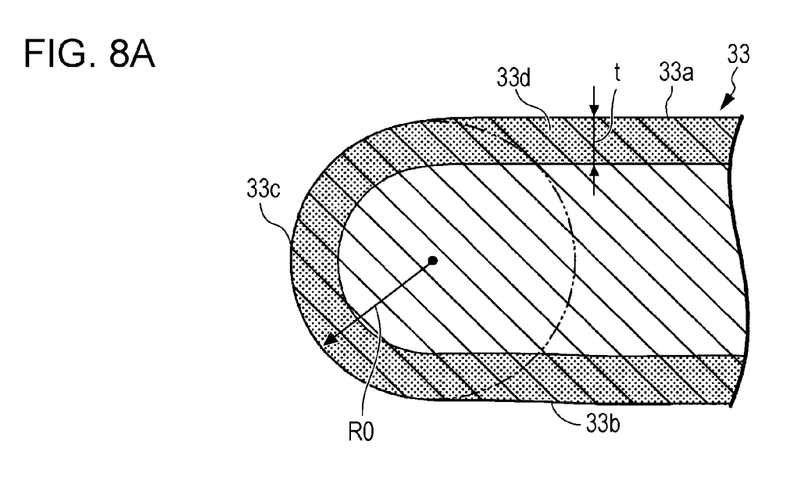
FIG. 8A is a diagram illustrating the relationship between the hardness of a nitrided layer and the radius of curvature of the end face of the metal ring according to an embodiment of the present invention.
Figure 8B:
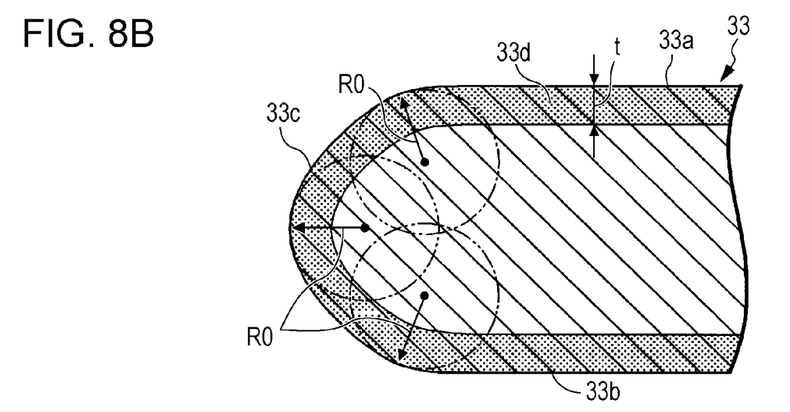
FIG. 8B is a diagram illustrating the relationship between the hardness of a nitrided layer and the radius of curvature of the end face of the metal ring according to an embodiment of the present invention.

The end face 33c of the metal ring 33 illustrated in FIG. 8A satisfies the condition according to the embodiment of the present invention. The end face 33c has an ideal shape, that is, an accurate semicircular shape with a radius of curvature RO that is greater than or equal to 1.5 times (about 3 times) the thickness t of a nitrided layer 33d. The radius of curvature RO is calculated as one half the thickness of the metal ring 33. However, the radius R of the imaginary circle C may be used instead. The end face 33c of the metal ring 33 illustrated in FIG. 8B also satisfies the condition according to the embodiment of the present invention. Although the shape of the end face 33c of the metal ring 33 is angular and is close to triangle rather than semicircle, the radius of curvature RO at each of the three corners is about twice the thickness t of the nitrided layer 33d, which satisfies the condition that the radius of curvature RO should be greater than or equal to 1.5 times the thickness t.

Figure 8C:
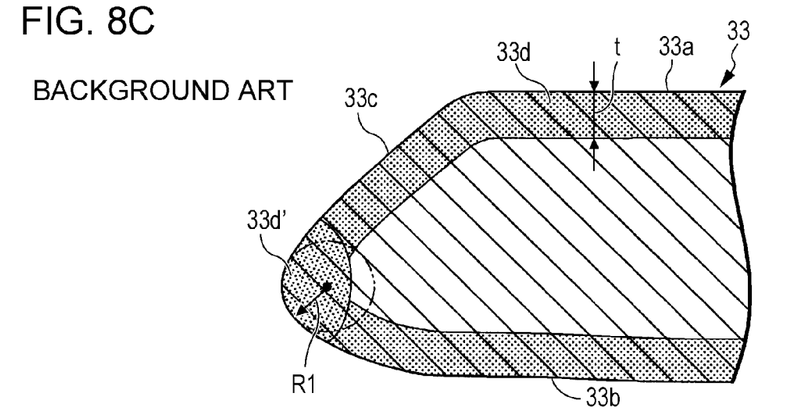
FIG. 8C is a diagram illustrating the relationship between the hardness of a nitrided layer and the radius of curvature of the end face of the metal ring according to a related art.

The end face 33c of the metal ring 33 illustrated in FIG. 8C is an example of the related art. The shape of the end face 33c of the metal ring 33 is angular and is close to triangle instead of semicircle. The radius of curvature R1 at the end portion of the end face 33c is excessively small, and is less than 1.5 times (about the same as) the thickness t of the nitrided layer 33d. In this case, an excessive amount of nitrogen enters and diffuses into a part of the end face 33c having the small radius of curvature R1. Therefore, the hardness of an excessive hardness layer 33d' at that part is locally increased compared to the hardness at other parts, and cracks are easily generated. As a result, the metal ring 33 has a lower strength and is easily damaged.

Figure 9:
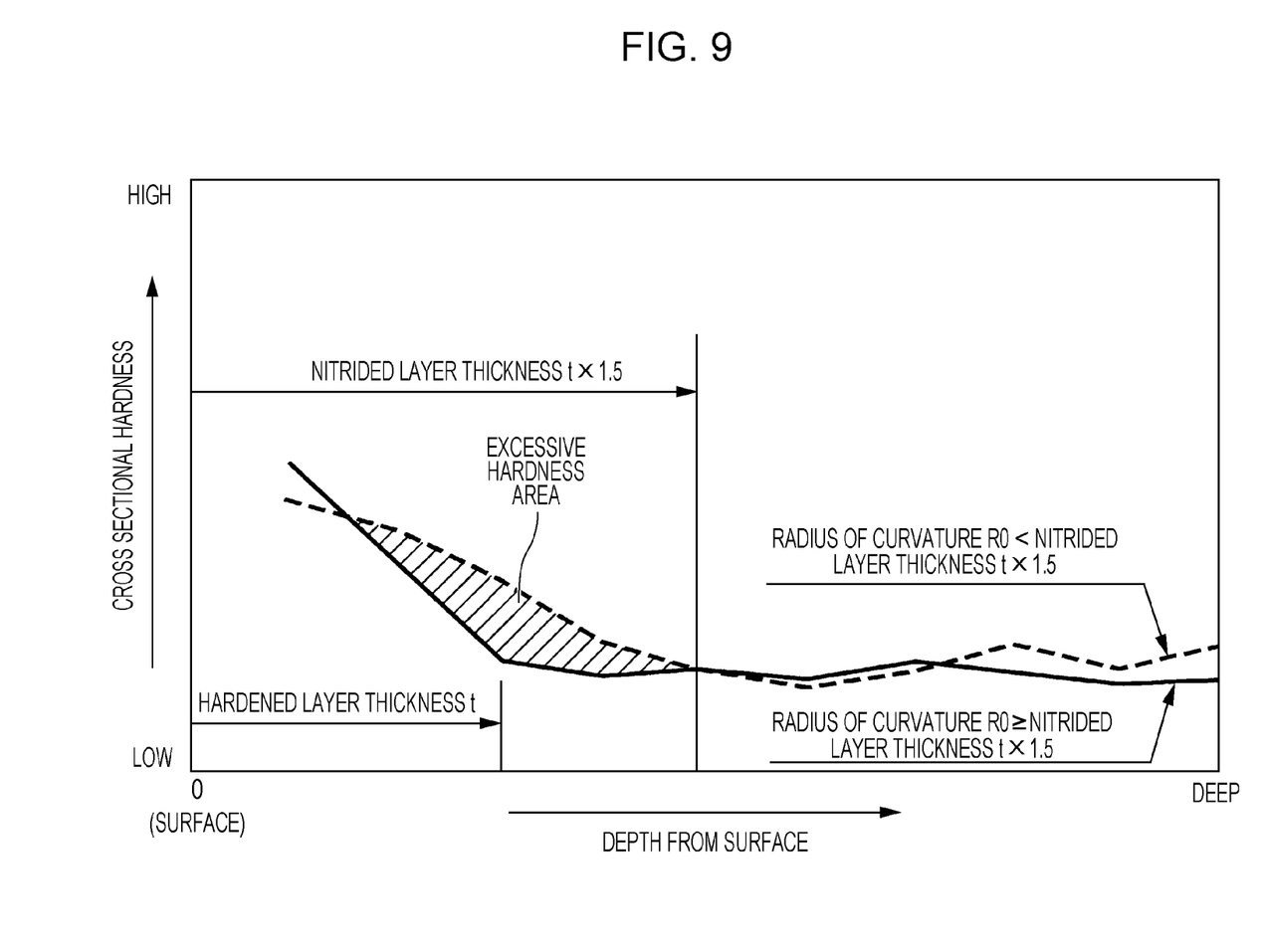
FIG. 9 is a graph illustrating the relationship between the depth from the surface of the end face of the metal ring and the hardness.

FIG. 9 is a graph illustrating the relationship between the depth from the surface of the end face 33c of the metal ring 33 and the cross sectional hardness. The solid line indicates an example of the present invention in which the radius of curvature of the end face 33c of the metal ring 33 is greater than or equal to 1.5 times the thickness t of the nitrided layer 33d, and the broken line indicates a comparative example in which the radius of curvature of the end face 33c of the metal ring 33 is less than 1.5 times the thickness t of the nitrided layer 33d. It is clear from this graph that the hardness of the comparative example is excessively higher than that of the example of the present invention in a range of less than 1.5 times the thickness t of the nitrided layer 33d.

Figure 10:
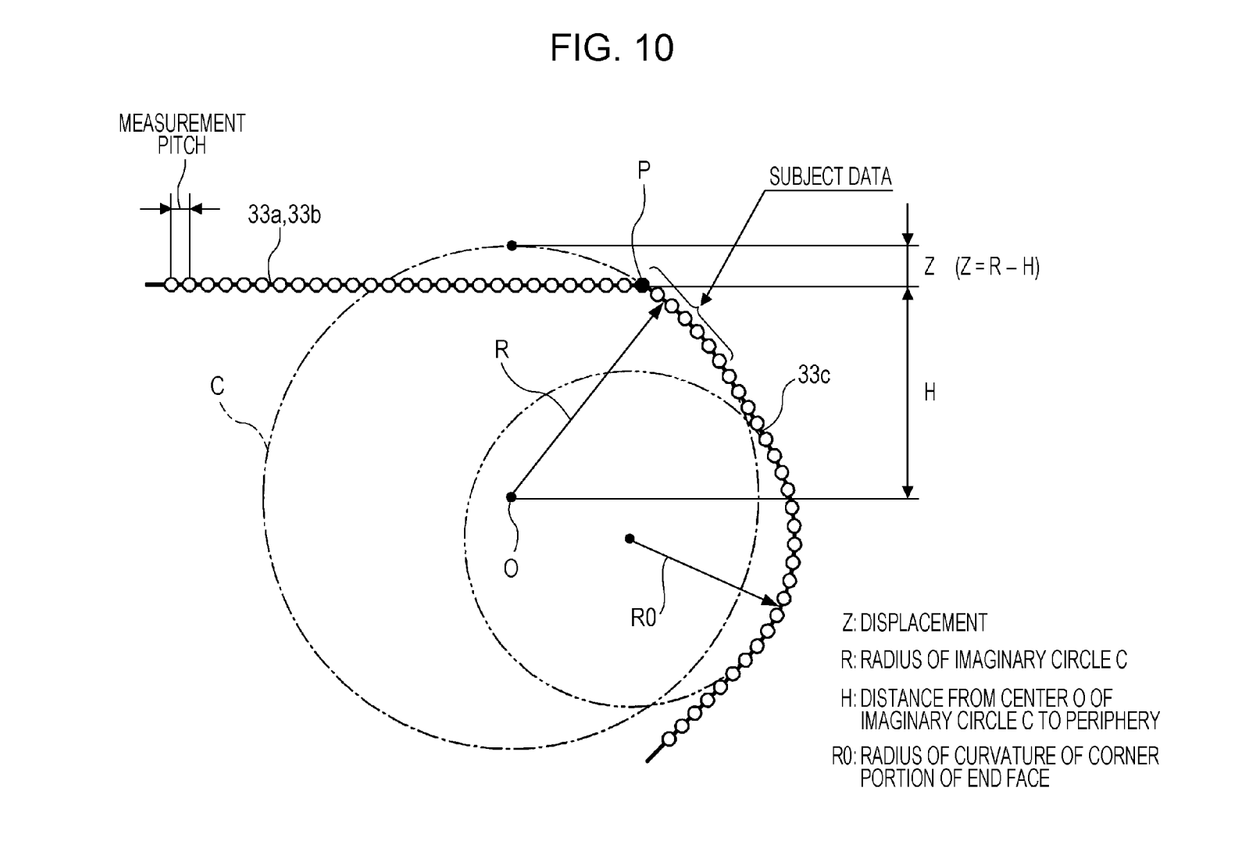
FIG. 10 is a diagram illustrating a method for measuring the displacement of the end face of the metal ring and the radius of curvature of the angular portion of the end face.

FIG. 10 illustrates a method for measuring the displacement of the end face 33c of the metal ring 33 included in the metal belt 9 and the radius of curvature RO of a corner portion of the end face 33c.

First, a shape measurement method for determining the displacement Z will be described. The displacement Z is determined to check whether or not the displacement ratio (Z/R)×100 (%) of the end face 33c of the metal ring 33 matches the desired value.

First, the peripheral surfaces 33a and 33b and the end face 33c of the metal ring 33 are measured at a certain measurement pitch with a measurement device including, for example, a contact probe or a laser. Thus, coordinate points along the shape of the metal ring 33 in cross section are determined.

Then, the coordinates of the contact points P between the end face 33c and the peripheral surfaces 33a and 33b are determined from the series of coordinates of the measurement points. More specifically, first, an arbitrary coordinate point is selected as a start point of a measurement range, and a difference between inclinations of approximated straight lines connecting the start point to the points on both sides thereof is calculated. Then, the calculation of the difference between the inclinations of approximated straight lines connecting each coordinate point to the points on both sides thereof is successively performed for all the measurement points until the end point of the measurement range is processed. When the difference between the inclinations of approximated straight lines connecting a certain coordinate point to the points on both sides thereof exceeds a preset threshold, that point is determined as one of the contact points P between the end face 33c and the peripheral surfaces 33a and 33b.

Next, a method for determining the radius of curvature R and the coordinates of the center O of the imaginary circle C will be described. The radius of curvature R and the coordinates of the center O of the imaginary circle C are determined by the least squares method using the coordinates of each contact point P and the coordinates of the measurement points corresponding to the subject data, which are some of the measurement points on the end face 33c that are arranged continuously from the contact points P. The displacement Z of the end face 33c of the metal ring 33 is determined from the radius of curvature R of the imaginary circle C determined by the above-described method and a distance H between the center O of the imaginary circle C to each of the peripheral surfaces 33a and 33b.

Next, the method for measuring the radius of curvature R0 of an angular portion the end face 33c will be described.

First, a range including the measurement points based on which the imaginary circle C was determined is shifted toward the end-face-33c side by an amount corresponding to one point, and a curvature for the shifted range is calculated by the least squares method. The calculation of the curvature by the least squares method is repeatedly performed while shifting the range by an amount corresponding to one measurement point at a time. Thus, the radius of curvature is determined for the entire area of the end face 33c. The radius of curvature is compared with the thickness t of the nitrided layer 33d of the metal ring 33. Thus, it can be determined whether or not the radius of curvature RO of the end face 33c of the metal ring 33 is greater than or equal to 1.5 times the thickness t of the nitrided layer 33d.

As described above, the substantially semicircular end face 33c of each of the metal rings 33 included in each metal ring assembly 31 of the belt-type continuously variable transmission T satisfies the following condition. That is, when the displacement Z of the end face 33c is defined as Z=R−H, R being the radius of the imaginary circle C that passes through the contact point P between the end face 33c and one of the outer peripheral surface 33a and the inner peripheral surface 33b and that is tangent to the end face 33c and H being the distance between the center O of the imaginary circle C to the one of the outer peripheral surface 33a and the inner peripheral surface 33b, Z≤0.1R is satisfied. Accordingly, the shape of the end face 33c of each metal ring 33 is closer to the accurate semicircle and the durability of the metal ring 33 is increased. As a result, the durability of the metal belt 9 included in the belt-type continuously variable transmission T is increased.

Although an embodiment of the present invention is described above, the present invention is not limited to the embodiment, and various design changes can be made within the scope of the present invention.

For example, although the end faces 33c of the metal rings 33 are polished by the polishing brushes 54 in the embodiment, the end faces 33c may instead be subjected to barrel polishing.

In addition, instead of dressing the polishing brushes 54 each time the polishing process is performed once, the dressing process may be performed every time the polishing process is performed a predetermined times or a random number of times.

According to the embodiment of the present invention, the shape of the end face is close to the accurate semicircle and the durability of the metal ring is increased. As a result, the durability of the continuously variable transmission metal belt is increased.

In the continuously variable transmission metal belt according to the embodiment of the present invention, a radius of curvature of the end face is preferably greater than or equal to 1.5 times a thickness of a nitrided layer formed on the surface of the end face.

In such a case, formation of cracks, which easily occurs when the nitrided layer is thick and the hardness thereof is excessively high, can be suppressed. As a result, the durability of the metal ring can be further increased.

According to the embodiment of the present invention, a method for manufacturing a metal ring for the above-described continuously variable transmission metal belt includes polishing the end face with a polishing brush to form the end face into a substantially semicircular shape.

With this method, the end face of the metal ring can be more evenly polished compared to the case in which the end face is polished by barrel polishing in which the metal ring and grain are stirred in a barrel. Accordingly, the processing accuracy can be increased, and the durability can be increased as a result.

In the above-described method, the polishing brush preferably includes metal wires having grain electrodeposited thereon.

In such a case, the durability of the polishing brush is higher than that of a polishing brush according to the related art which includes synthetic resin wires containing grain. Accordingly, even when the frequency of dressing is reduced, reduction in the processing accuracy of the end face of the metal ring caused by degradation of the polishing brush can be minimized.

In the above-described method, the polishing brush is preferably subjected to dressing each time the polishing brush is used to polish the end face or every time the polishing brush is used to polish the end face for a certain number of times.

In such a case, the processing accuracy of the end face of the metal ring can be further increased.

According to the embodiment of the present invention, a method for measuring a shape of a metal ring for the above-described continuously variable transmission metal belt includes measuring coordinates of a plurality of measurement points on the peripheral surface and the end face of the metal ring; determining coordinates of the contact point on the basis of the series of coordinates of the measurement points; and determining coordinates of the center of the imaginary circle by the least squares method using the coordinates of the contact point and the coordinates of the measurement points on the end face that are arranged continuously from the contact point.

With this method, the coordinates of the center of the imaginary circle can be accurately determined. As a result, the displacement Z of the end face can be accurately calculated.

Each of an outer peripheral surface 33a and an inner peripheral surface 33b corresponds the above-described peripheral surface.

Obviously, numerous modifications and variations of the present invention are possible in light of the above teachings. It is therefore to be understood that within the scope of the appended claims, the invention may be practiced otherwise than as specifically described herein.

What is claimed is:

1. A method for manufacturing a metal ring for a continuously variable transmission metal belt, comprising:
    polishing an end face of the metal ring with a polishing brush to form the end face into a substantially semicircular shape, the end face being connected to an end of a flat peripheral surface of the metal ring in a width direction of the metal ring; and
    setting a displacement Z of the end face smaller than or equal to 0.1R, the displacement Z being defined as $Z = R - H$, R being a radius of an imaginary circle that passes through a contact point between the peripheral surface and the end face and that is tangent to the end face, H being a distance from a center of the imaginary circle to the peripheral surface.

2. The method according to claim 1,
    wherein the polishing brush includes metal wires having grain electrodeposited on the metal wires.

3. The method according to claim 2,
    wherein the polishing brush is subjected to dressing after each time the polishing brush is used to polish the end face or after the polishing brush is used to polish the end face for a predetermined number of times.

4. The method according to claim 1,
    wherein the polishing brush is subjected to dressing after each time the polishing brush is used to polish the end face or after the polishing brush is used to polish the end face for a predetermined number of times.

5. The method according to claim 1,
    wherein the end face is polished into the substantially semicircular shape having a radius of curvature of the end face after polishing that is greater than or equal to 1.5 times a thickness of a nitrided layer formed on a surface of the end face.

6. The method according to claim 5,
    wherein the polishing brush includes metal wires having grain electrodeposited on the metal wires.

7. The method according to claim 6,
    wherein the polishing brush is subjected to dressing after each time the polishing brush is used to polish the end face or after the polishing brush is used to polish the end face for a predetermined number of times.

8. The method according to claim 5,
    wherein the polishing brush is subjected to dressing after each time the polishing brush is used to polish the end face or after the polishing brush is used to polish the end face for a predetermined number of times.

* * * * *